(12) United States Patent
Gillin et al.

(10) Patent No.: US 8,249,945 B2
(45) Date of Patent: Aug. 21, 2012

(54) METHOD AND SYSTEM OF ENABLING ELECTRONIC COMMUNICATION WITHOUT KNOWLEDGE OF RECEIVING PARTY'S ELECTRONIC CONTACT INFORMATION

(75) Inventors: Matthew J. Gillin, Villanova, PA (US); Peter O. Flick, Strafford, PA (US); Tobias P. DiPasquale, Ridley Park, PA (US); Andrew L. Newcomb, Philadelphia, PA (US); Paul L. Raden, Phoenixville, PA (US)

(73) Assignee: Relay Holdings, LLC, Radnor, PA (US)

( * ) Notice: Subject to any disclaimer, the term of this patent is extended or adjusted under 35 U.S.C. 154(b) by 392 days.

(21) Appl. No.: 12/709,312

(22) Filed: Feb. 19, 2010

(65) Prior Publication Data

US 2011/0206197 A1    Aug. 25, 2011

(51) Int. Cl.
    *G06Q 30/00*      (2012.01)
(52) U.S. Cl. .................. 705/26.41; 379/98.24
(58) Field of Classification Search ........... 705/26.41, 705/26.62, 100.08; 379/88.13, 88.14, 88.17, 379/93.24, 100.08
See application file for complete search history.

(56) References Cited

U.S. PATENT DOCUMENTS 6,026,374 A * 2/2000 Chess .................. 705/26.41

OTHER PUBLICATIONS

Stein, Fuzzy-Fingerprints for Text-Based Information Retrieval, Journal of Universal Computing Science, No Month Available 2005, pp. 572-579, Bauhaus University (2005), available at http://www.uni-weimar.de/medien/webis/publications/downloads/papers/stein_2005a.pdf.

* cited by examiner

*Primary Examiner* — Creighton Smith
(74) *Attorney, Agent, or Firm* — Woodcock Washburn LLP

(57) ABSTRACT

By providing identification information for a second party, a first party may access address profiles to send an electronic communication to the second party without knowing the electronic contact information for the second party. The address profiles are created by collecting electronic contact information from a plurality of public and private sources. A code may then be assigned to the information from each source for each party identified. Codes from respective sources may then be analyzed for similarities in order to identify codes that may correspond to the same party above a similarity threshold. When codes correspond above the similarity threshold for the same party, an address profile may be associated with the codes and may be associated with the same party. An internal identifier may then be assigned to the address profile to, for example, identify the address profile and/or the matched codes associated with the address profile so that the address profile may be accessed without knowledge of whose address profile is be accessed.

22 Claims, 8 Drawing Sheets

200

---

210
Collecting information from a plurality of sources including electronic contact information for parties that may include the second party.

---

215
Assigning codes to the information from each source for each party.

---

220
Analyzing codes from respective sources for similarities of codes that correspond to a same party above a similarity threshold.

---

225
Associating an address profile for the same party having codes that are matched.

410
Retrieve information from a data source.

415
Normalize the information into a form suitable for code generation

420
Generate a relay code based on the normalized information using a fingerprinting algorithm.

425
Associate the source information with the relay code.

610
Retrieving a first relay code and a second relay code from a data source.

615
Retrieving a similarity threshold

620
Determining whether the first and second relay codes correspond to a same party above the similarity threshold

Figure 6

METHOD AND SYSTEM OF ENABLING ELECTRONIC COMMUNICATION WITHOUT KNOWLEDGE OF RECEIVING PARTY'S ELECTRONIC CONTACT INFORMATION

FIELD OF THE INVENTION

The present invention relates to an electronic communication system and method and, more particularly, to a system and method for collecting contact information for potential recipients of electronic communications and for providing access to the collected contact information for the delivery of messages without revealing the collected contact information to the party sending the message.

BACKGROUND

Many businesses would like to communicate with their customers electronically but are unable to do so because they do not have electronic contact information for their customers. For example, a utility company may wish to send bills to its customers via e-mail; however, the utility company is unable to do so because it does not have e-mail addresses for its customers. Because these businesses are unable to communicate with their customers electronically, these businesses are forced to communicate with their customers via more costly and inefficient channels, such as by mail or by telephone.

To address this issue some businesses have attempted to gather electronic contact information for their customers by allowing their customers to create electronic accounts, by contacting their customers to request electronic contact information, or by requiring their customers to provide electronic contact information. Unfortunately, such efforts may require a lot of time and money and may not produce the desired results. Furthermore, such efforts may require active participation of customers who may not have an incentive to provide the requested electronic contact information.

SUMMARY

Disclosed herein are systems and methods of enabling electronic communication from a first party, such as a business, to a second party, such as a customer of the business, without the first party necessarily having or obtaining knowledge of the second party's electronic contact information. For example, address profiles for a number of parties that may include the second party may be created. To create the address profiles, information from a plurality of sources, such as a transaction partner, a communication partner, a data partner, or the like may be collected. The information collected may include electronic contact information, such as a cell phone number, an e-mail address, a software application, or the like for the second party. In one example embodiment, the identity of the software application may be used to transmit an electronic communication to the customer. For example, the software application may be running on a cell phone and may be capable of providing a text notification to the customer. Once the software application has been identified, the software application can receive a message from the first party and provide the message to the customer via the text notification.

Once the information is collected from each source, a code may be assigned to the information from each source for each party identified. For example, a code may be assigned to a cell phone number and an e-mail address identified for the second party within a cell phone service provider's database. Codes from respective sources may then be analyzed for similarities in order to identify codes that may correspond to the same party above a similarity threshold, such as a requirement that codes are 95% similar. This may be done to, for example, anonymously link information regarding the second party in multiple sources without the need to move any information from its original location. When codes correspond above the similarity threshold for the same party, an address profile may be associated with the codes and may be associated with the same party. For example, an address profile for an individual may contain codes that link to the electronic contact information for that individual. An internal identifier may then be assigned to the address profile to, for example, identify the address profile and/or the matched codes associated with the address profile.

By providing identification information for the second party, the first party may use the created address profiles to send an electronic communication to the second party without knowing the electronic contact information for the second party. The identification information for the second party may be an account number, a physical address, a name, or the like. In one example embodiment, the identification information for the second party may be used to search for a created address profile for the second party. The created address profile for the second party may include an internal identifier and/or electronic contact information for the second party. The internal identifier may identify the created address profile. If the identification information for the second party matches a created address profile for the second party, the electronic communication from the first party may be sent to the second party using the electronic contact information that may be in the created profile identified by the internal identifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Exemplary embodiments of the invention will be described in connection with the associated figures, of which:

FIG. 2 illustrates an example embodiment of a method for creating address profiles to enable electronic communication from a first party to a second party without the first party having or obtaining knowledge of the second party's electronic contact information.

FIG. 4 illustrates an example embodiment of a method for assigning a code to information for a second party from a source.

FIG. 6 illustrates an example embodiment for analyzing codes from respective sources for similarities for codes that correspond to a same party above a similarity threshold.

DETAILED DESCRIPTION OF ILLUSTRATIVE EMBODIMENTS

A detailed description of illustrative embodiments of the present invention will now be described with reference to FIGS. 1-8. Although this description provides a detailed example of possible implementations of the present invention, it should be noted that these details are intended to be exemplary and in no way delimit the scope of the invention.

Figure 1:
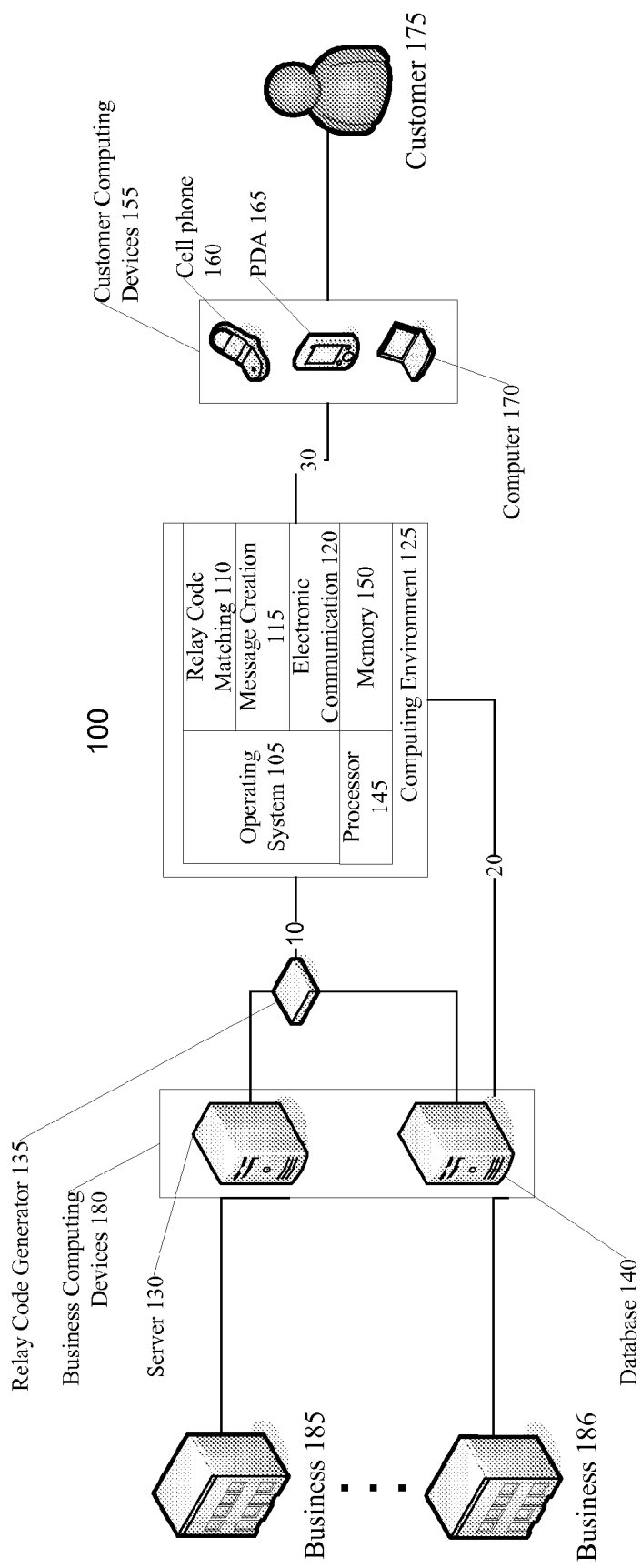
FIG. 1 illustrates an example embodiment of a system for enabling electronic communication from a first party to a second party without the first party having or obtaining knowledge of the second party's electronic contact information.

FIG. 1 illustrates an example embodiment of a system for enabling electronic communication from a first party, such as a business, to a second party, such as a customer, without the first party having or obtaining knowledge of the second party's electronic contact information. As shown in FIG. 1, the system 100 may include a computing environment 125. The computing environment 125 may be a computer, a mainframe, a server, or the like. According to an example embodiment, the computing environment 125 may include hardware components and/or software components such that the computing environment 125 may be used to execute applications such as internet applications, operating systems, server applications, client applications, database applications, or the like. For example, the computing environment 125 may be used to execute a relay code matching module 110, a message creation module 115, and electronic communication module 120, and/or a relay code generator module 135 that may be integral to computing environment 125 or separate, as illustrated in FIG. 1.

In an example embodiment, the computing environment 125 may further include a processor 145 that may be in operative communication with memory component 150, operating system 105, relay code matching module 110, message creation module 115, electronic communication module 120, and/or relay code generator module 135. The processor 145 may include a standardized processor, a specialized processor, a microprocessor, or the like. The processor 145 may execute instructions including, for example, instructions for creating address profiles, sending electronic communications, or any other suitable instruction, which will be described in more detail below.

The computing environment 125 may further include a memory component 150 that may store the instructions that may be executed by the processor 145. The memory component 150 may include computer readable storage medium in the form of volatile and/or nonvolatile memory such as random access memory (RAM), read only memory (ROM), cache, Flash memory, a hard disk, or any other suitable storage component. In one embodiment, the memory component 150 may be a separate component in communication with the computing environment 125 and the processor 145. According to another embodiment, the memory component 150 may be integrated into the processor 145.

As shown in FIG. 1, the computing environment 125 may be in communication with relay code generator module 135, business computing devices 180, and customer computing devices 155 via communication links 10, 20, and/or 30. The communication link 10, 20, and 30 may be a wired connection including, for example, a USB connection, a Firewire connection, an Ethernet cable connection, or the like and/or a wireless connection such as a wireless 802.11b connection, a radio connection, a cell phone connection, or the like.

The computing environment 125 may enable electronic communication from the business 185 and/or the business 186 to the customer 175 without the business 185 and/or the business 186 knowing or obtaining knowledge of the electronic contact information that for the customer 175. For example, the computing environment 125 may enable the business 185 to send an electronic communication to the customer 175 via the customer computing devices 155. The customer computing devices 155 may be a cell phone, such as cell phone 160; a PDA, such as PDA 165; a computer, such as computer 170; or the like. The business 185 and/or the business 186 may be a transaction partner, such as a corporation that has significant consumer transactions; a communication partner, such as a corporation that may have incomplete electronic contact information; or a data partner, such as a company that has data that may be used to enhance an address profile.

In one example, the computing environment 125 may used by one or more businesses to contact its customers, who may overlap with the customers of other businesses. For example, the business 186 may use the computing environment 125 to send an electronic communication to the customer 175 who may be a customer of both the business 185 and the business 186. This may be done to, for example, enable the business 186 to send an electronic communication to the customer 175 using electronic contact information for the customer 175 that may be known to the business 185. For example, the electronic contact information for the customer 175 may be within the database 140 that may belong to the business 185. To send an electronic message from the business 186 to the customer 175, the computing environment 125 may retrieve the electronic contact information for the customer 175 from the database 140. In retrieving the electronic contact information, the computing device 125 may keep the electronic contact information anonymous such that the identity of the customer 175 is not known to the business 186 and/or the computing environment 125. An electronic communication may then be sent from the business 186 to the customer 175 using the electronic contact information obtained from the business 185.

In example embodiment, the computing environment 125 may create address profiles for a number of parties that may include the customer. To create the address profiles, information from a plurality of sources, such as the business computing devices 180, may be collected. The business computing devices may belong to the business 185, the business 186, or both. For example, the database 140 may belong to the business 186 while the server 130 may belong to the business 185. The business computing devices 180 may include a web server, a database, a mainframe, or the like. For example, the business computing devices 180 may include the business server 130 and/or the business database 140.

According to one example embodiment, the relay code generator module 135 may be used to collect information from a plurality of sources and/or assign a code to the information from each source for each party that may be identified. The relay code generator module 135 may be software that is executed within the computing environment 125, software that is executed within the business computing devices 180, or software that is executed on a standalone computing device. The standalone device may be any device capable of executing software separate from the computing environment 125 and the business computing devices 180.

The relay code generator module 135 may collect information from a plurality of sources, such as the business computing devices 180. The information collected by the relay code generator module 135 may include electronic contact information, such as a cell phone number, an e-mail address, an identity of a software application, or the like for the customer 175. In one example embodiment, the identity of the software application may be used to transmit an electronic communication to the customer 175. For example, the software application may be running on a cell phone and may be capable of providing a text notification to the customer 175. Once the software application has been identified, the software application can receive a message from the business 185 and provide the message to the customer 175 via the text notification.

As the relay code generator module 135 collects information from the business computing devices 180, the relay code generator module 135 may generate a code to the information from each source for each party identified. The code may be generated in any method known in the art, for example, the code may be generated according to a check sum algorithm, a fingerprinting algorithm, or the like. The code may then be assigned to the information. For example, a code may be assigned to a cell phone number and an e-mail address identified for the second party within a cell phone service provider's database, such as the business database 140.

According to an example embodiment, the relay code matching module 110 may analyze the codes that have been assigned to information by the relay code generator module 135. In analyzing codes, the relay code matching module 110 may analyze codes from respective sources for similarities in order to identify codes that may correspond to the same party above a similarity threshold, such as a requirement that codes are 95% similar. This may be done to, for example, anonymously link information for the customer 175 in the business server 130 to information for the customer 175 in the business database 140 of another source without having to move any of the information from its original location.

When codes correspond above the similarity threshold for the same party, the relay code matching module 110 may create an address profile for the same party and may associate the matching codes with an address profile. For example, the relay code matching module 110 may identify codes that correspond to electronic contact information for the customer 175 and may create an address profile containing those codes such that the electronic contact information for the customer 175 may later be retrieved and/or referenced. In another example embodiment, when codes correspond above the similarity threshold for the same party, the relay code matching module 110 may update a previously created address profile for the same party. For example, the relay code matching module 110 may retrieve a previously created address profile for the same party and update that the previously created address profile with information referenced by the matching codes.

After the relay code matching module 110 has created or updated an address profile, the relay code matching module 110 may then assign an internal identifier to the address profile to, for example, identify the address profile and/or the matched codes associated with the address profile. The address profiles may then be used by the business 185 to send an electronic communication to the customer 175 when the business 185 does not have the electronic contact information for the customer 175. For example, the business 185 may use the address profiles in order to e-mail a bill notification to the customer 175 even though the business 185 does not have the e-mail address for the customer 175. In using the address profiles, the business 185 may provide identification information, such as account information, a physical address, a name, or the like for the customer 175.

In one example embodiment, the business 185 may provide identification information for the customer 175 to the computing environment 125 where it is received by the message creation module 115. The identification information may be accompanied by or may be contained in a message, such as a letter, a bill, a notification, or the like. For example, the business 185 may instruct the business server 130 to transmit a letter in XML form to the computing environment 125. Once the identification information and/or the message have been received, the message creation module 115 may request that the relay code generator module 135 assign a code to the identification information. Using the code provided by the relay code generator 135, the relay code matching module 110 may search for and retrieve an address profile that may be associated with the customer 175. The retrieved address profile may contain codes that may link to electronic contact information for the customer 175 that may be within a plurality of sources. Using the codes within the retrieved address profile, the relay code matching module 110 may retrieved electronic contact information for the customer 175 and may provide the electronic contact information to the message creation module 115.

When the message creation module 115 receives the electronic contact information, the message creation module 115 may identify a first format. The first format may be the format of the message provided by the business server 130. The message creation module 115 also may analyze the electronic contact information to determine a second format. The second format may be the format necessary to send an electronic communication to the customer 175. For example, the electronic contact information may indicate that the customer has a cell phone capable of receiving text messages in a text format. Upon determining the second format, the message creation module 115 may translate the message from the first format into the second format and may deliver the message to the customer computing devices 155. For example, the message creation module 115 may translate a message from an XML format into an e-mail in an HTML format that may then be delivered to a customer computing device, such as the computer 170. In another example embodiment, the message creation module 115 may identify the first format before, or as the electronic contact information is received.

In an example embodiment, the electronic contact information may indicate that a specific transmission protocol may be required to transmit a message to the customer computing devices 155. For example, the electronic contact information may contain a cell phone number that may be used to send a short message service (SMS) to the customer 175 using the signaling system number seven (SS7) protocol. When the electronic contact information requires a transmission protocol, the message creation module 115 may create a message as described above and provide that message to the electronic communication module 120. The electronic communication module 120 may then retrieve one or more transmission protocols based on the electronic contact information and may select a transmission protocol from the one or more transmission protocols. The transmission protocol may be any protocol used to transmit an electronic communication such as the transmission control protocol (TCP), the user datagram protocol (UDP), the SS7, or the like. Using the transmission protocol, the electronic communication module 120 may translate the message from a first format into a second format based on the selected protocol. The message may then be transmitted to the customer computing devices 155 using the transmission protocol.

FIG. 2 illustrates an example embodiment of a method for creating address profiles to enable electronic communication from a first party, such as the business 185, to a second party, such as the customer 175, without the first party having or obtaining knowledge of the second party's electronic contact information. For example, an address profile that may contain the electronic contact information for the customer 175 may be created in order to enable the business 185 to send an electronic communication to the customer 175, even though the business 185 may not have the electronic contact information for the customer 175. This may be done to, for example, allow the business 185 to automatically enroll the customer 175 into an electronic paperless billing system without requiring the business 185 to directly obtain electronic contact information for the customer 175. The example method 200 may be implemented using, for example, the system 100 described above with respect to FIG. 1. In an example embodiment, the example method 200 may take the form of program code (i.e., instructions) that may be executed by, for example, the computing environment 125 described above with respect to FIG. 1.

At 210, information from a plurality of sources that may include electronic contact information for a second party, such as the customer 175, may be collected. The plurality of sources may be any source that may include electronic contact information for the second party such as a department of motor vehicle database, a credit card server, a banking database, a cell phone provider server, or the like. The information collected may include electronic contact information, such as a cell phone number, an e-mail address, a software application, or the like for the second party. For example, the relay code generator 135 may be placed on a DMV database to collect driving records that may include electronic contact information for a number of parties that may include the second party. Further details regarding the collection of electronic contact information will now be described with respect to FIG. 3.

Figure 3:
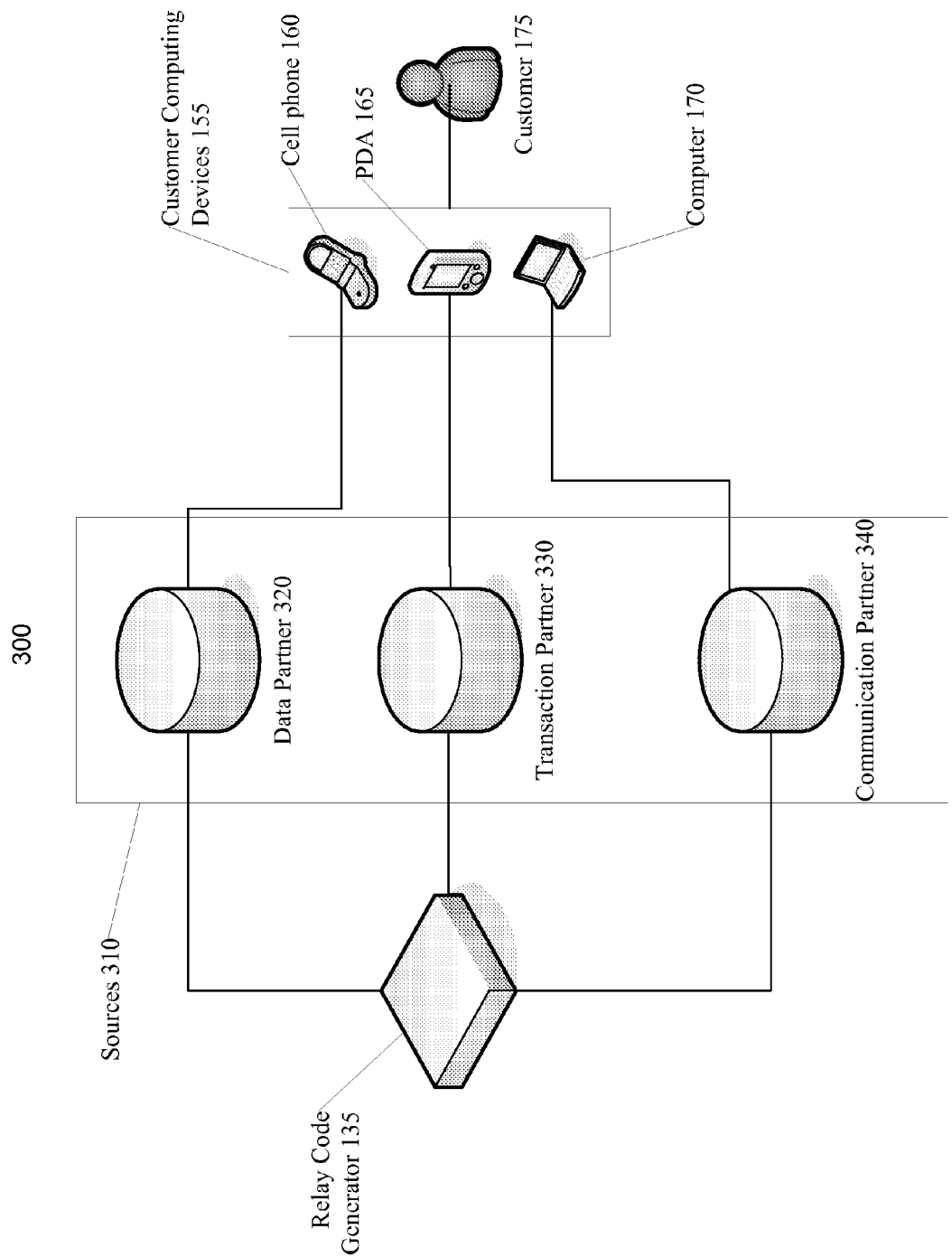
FIG. 3 illustrates an example embodiment of a method for collecting information from a plurality of sources that may include contact information for a customer.

FIG. 3 illustrates an example embodiment of a method 300 for collecting information from a plurality of sources that may include contact information for a customer, such as the customer 175. The method 300 may be performed by a relay code generator module, such as the relay code generator module 135. The relay code generator 135 may begin to collect information from the sources 310 automatically or upon receiving a request to collect information. For example, the relay code generator module 135 may receive a request from the relay code matching module 110, the message creation module 115, the electronic communication module 120, or the business 185.

In collecting information, the relay code generator module 135 may access the sources 310. In an example embodiment, the relay code generator module 135 may analyze the information in the sources 310 and may retrieve only the information that the relay code generator module 135 has determined to be relevant. For example, the relay code generator 135 may only retrieve information that has been confirmed to contain electronic contact information. In this way, the relay code generator 135 may optimize the amount of information retrieved from the sources 310 such that the retrieved information may only contain electronic contact information. In another example embodiment, the relay code generator 135 may retrieve information for any party that may be identified within the sources 310. The relay code generator 135, for example, may first identify parties within the sources 310. Once parties have been identified within the sources 310, information related to those parties may be retrieved. This may be done to, for example, ensure that the relay code generator 135 may retrieve information only for parties that may be identified. In yet another example embodiment, the relay code generator 135 may then retrieve information only for the identified parties. In yet another example embodiment, the relay code generator 135 may retrieve all available information in the sources 310.

The sources 310 may be any source capable of providing information, such as a data partner 320, a transaction partner 330, a communication partner 340, or the like. A data partner, such as the data partner 320, may be a company that has data that may be used to enhance an address profile. For example, a data partner may be a credit company that can provide a credit score and a credit report for a customer. A transaction partner, such as the transaction partner 330, may be a corporation that has significant consumer transactions. For example, the transaction partner 330 may be a mortgage company, a credit card company, a cable company, a satellite company, a broadband company, a utility company, an insurance company, or the like. A communication partner, such as the communication partner 340, may be a corporation that may have electronic contact information for a plurality of parties. In one example embodiment, the communication partner may have already authenticated a plurality of parties and may have the ability to send an electronic communication to those parties. For example, the communication partner 340 may be a cell phone company that has a cell phone number for a customer and has the ability to send a text message to that customer.

The sources 310 may include commercially available information regarding a plurality of parties, such as electronic contact information for the customer 175. For example, the sources 310 may include electronic contact information for customer computing devices 155 that may be associated with the customer 175. In one example embodiment, the electronic contact information may be a cell phone number for a cell phone, such as the cell phone 160; an internet protocol (IP) address for a PDA, such as the PDA 165, or a computer, such as the computer 170; an e-mail address; or the like. Additionally, the electronic contact information may include information regarding the customer 175 such as, demographic information, financial information, consumer information, credit information, personal information, or the like. The information at the sources 310 may reside on a computing device such as the business computing devices 180, shown with respect to FIG. 1. For example, the data partner 320 may provide information to the relay code generator module 135 through a server, a database, a customer relations management system, or the like.

Referring back to FIG. 2, at 215, codes may be assigned to the information from each source for each party as collected. This may be done to, for example, permit information for an identified party from one source to be an anonymously linked to information for the identified party in another source. By linking information, the codes may be used to deliver an electronic communication to the second party while keeping all information, such as the electronic contact information for the second party, anonymous at all times. Additionally, the codes may enable the information to be used while permitting the information to remain at its original location. For example, a code may be assigned to a cell phone number and may enable a business to send an electronic communication to a customer without moving the cell phone number from the source at which it is located. Further details regarding the assignment of codes to the information from each source for each party as collected will now be described with respect to FIG. 4.

FIG. 4 illustrates an example embodiment of a method for assigning a code to information for a second party, such as the customer 175, from a source.

At 410, information may be retrieved from a data source such as the business computing devices 180, shown in FIG. 1, and/or the sources 310 shown in FIG. 3. In one example embodiment, the information retrieved may be only information in that data source that includes electronic contact information. In another example embodiment, the information retrieved may be information for any party that may be identified within the data source. In yet another example embodiment, the information retrieved may be all available information in the data source.

At 415, the information may be normalized into a form suitable for code generation. This may be done to, for example, to ensure that the information is in a form that may be understood by a code generator, such as the relay code generator module 135 with respect to FIG. 1. In one example embodiment, information received from the data source may have one or more possible representations. For example, a cell phone number may have several correct representations such as 610-555-1212 or (610) 555-1212. To ensure that the information is in a form that may be understood by the code generator, the received information may be compared against different representations to determine if the received information has an equivalent format. When an equivalent format for the received information has been determined, the received information may be converted to the equivalent format in order to normalize the information such that information of a similar type may be in a similar form. In the example of the cell phone number previously provided, both representations of the cell phone number may be recognized and may be converted to ensure that all both cell phone numbers are described as a string of numbers with no special characters such as 6105551212. In another example embodiment, the received information may be normalized by eliminating redundant data, verifying data integrity, or the like. For example, errors within the retrieved information may be identified and corrected automatically. Further details regarding a method of normalizing information into a form suitable for code generation will now be described with respect to FIG. 5.

Figure 5:
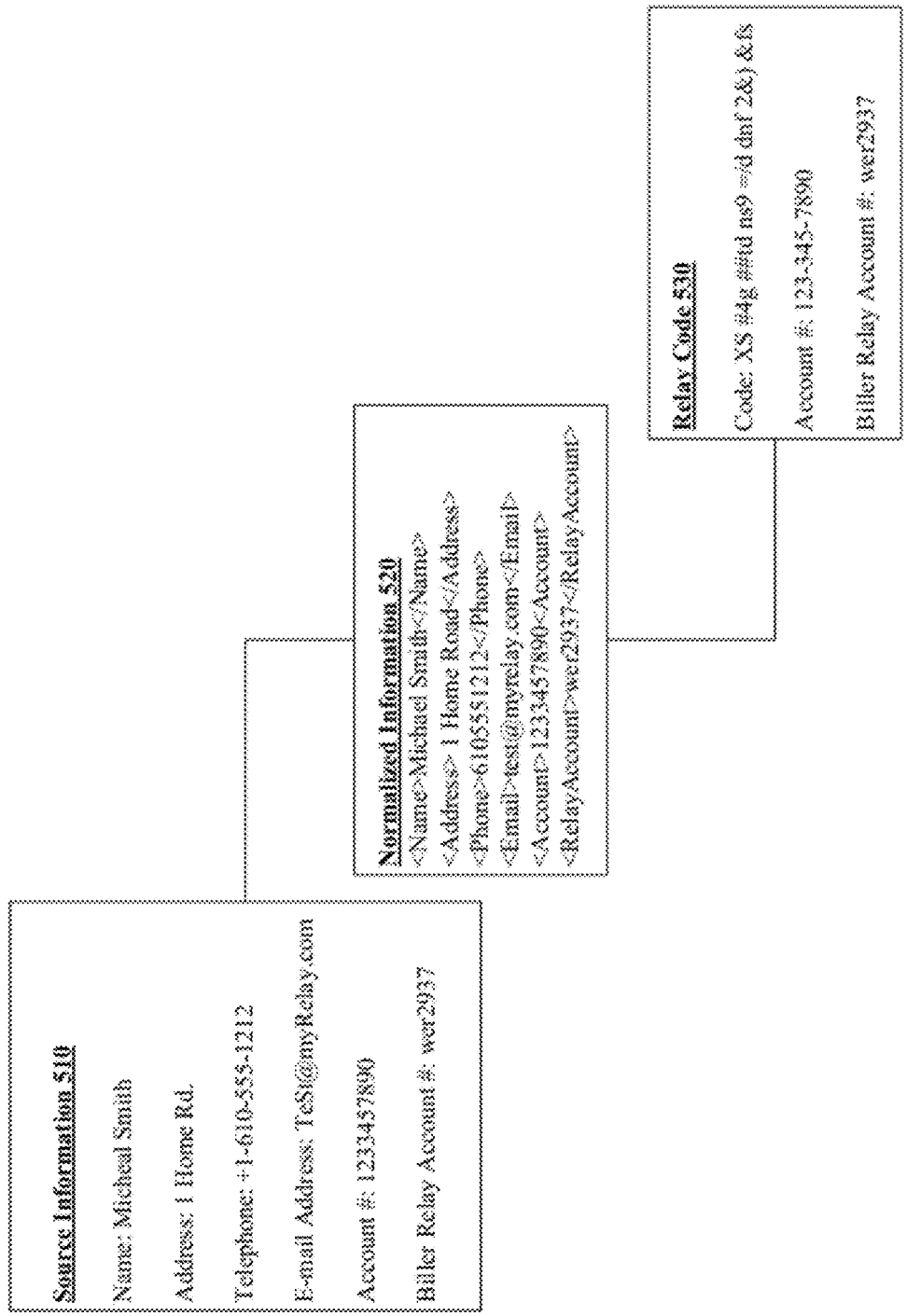
FIG. 5 illustrates an example embodiment of a method for normalizing information and generating a code based on the normalized information.

FIG. 5 illustrates an example embodiment of a method for normalizing information and generating a code based on the normalized information. In one example embodiment, source information, such as the source information 510, may be retrieved from a data source. The source information 510 may include fields such as a name, an address, a telephone number, an e-mail address, an account number, and the like. The source information may be a database record and may not be in a format understood by the code generator. When the source information 510 is retrieved, the source information 510 may be normalized by analyzing the format of the source information and/or analyzing the fields within the source information 510. The source information 510 may then be translated into the normalized information 520. For example, the code generator 135 may be able to understand data in an XML format; however, the source information 510 may be identified as being in a database format. Once identified as being in a database format, the source information 510 may be normalized by translating the source information 510 from the database format into the XML format. Additionally, the source information 510 may be analyzed to identify errors and/or invalid data. For example, the name field in the source information 510 contains "Micheal," which is a misspelling of the name "Michael." In translating the source information 510 into the normalized information 520, the error in the name fields may be identified and corrected automatically such that the normalized information 520 may contain a name field that reads "Michael."

In generating a code, the normalized information may first be analyzed in order to determine a number of fields that may be used to create the code. In one example embodiment, the normalized information 520 may be analyzed to determine the fields that are most likely to contain unique information. By using fields that contain unique information, it may be possible to increase the likelihood that the generated codes are also unique. For example, a unique code may only be generated using a unique identifier such as a Social Security number. In another example embodiment, the fields of the normalized information 520 may be analyzed to determine which fields contain valid information. This may be done to, for example, reduce the likelihood that errors within data fields may influence and/or a fact a code that is generated based on those fields. In yet another example embodiment, one or more fields may be selected from the normalized information 520 according to the source that the normalized information 520 was derived from. For example, the normalized information 520 may be based only on known "reliable" sources such as a DMV record, and a driver's license number may be selected to use in generating a code.

Once one or more fields from the normalized information 520 have been determined, a code, such as relay code 530, may be generated. To generate a code, any number of fingerprinting algorithms known in the art may be used. For example, a code may be generated using Rabin's fingerprinting algorithm, a cryptographic hash function, a hash function, a checksum, a digital signature, or the like. The fingerprinting algorithm may be capable of ensuring that the possibility of two different pieces of information will have the same fingerprint is negligible. For example, the fingerprinting algorithm may be selected to generate a 64-bit long fingerprint that may provide uniqueness in a large file system and/or database. In one example embodiment, the fingerprinting algorithm may be the algorithm described by Benno Stein in *Fuzzy-Fingerprints for Text-Based Information Retrieval*, Journal of Universal Computing Science, pp. 572-579, Bauhaus University (2005) available at http://www.uni-weimar.de/medien/webis/publications/downloads/papers/stein_2005a.pdf.

Referring back to FIG. 4, at 420, the code may thus be generated based on the normalized information using a fingerprinting algorithm. This may be done to, for example, uniquely identify information, such as electronic contact information for a party, while keeping the data anonymous. Additionally, the fingerprint may permit the information to be used without removing the information from its location at the data source. Next, at 425, the source information may be associated with the relay code. This may be done, for example, to link the code to the source information, such as the source information 510 illustrated in FIG. 5. By linking the code to the source information, the code may be used to reference the source information and may permit the source information to be used without moving the source information from its location. In keeping the source information at its original location, privacy concerns and/or policies may be alleviated. For example, due to privacy concerns, the source information may not be removed from the source location. To alleviate the privacy concerns, the exemplary embodiment may analyze the source information at the source and may generate codes that may link to the electronic information. The codes may then be used to reference the electronic information such that the source information may be used while the protecting the sensitive information by ensuring that the information may never be moved.

In one example embodiment, additional steps may be used to keep the information protected. For example, the relay code may be encrypted such that the codes may be unreadable to anyone except those possessing the encryption algorithm.

As shown in FIG. 5, the relay code 530 may be associated with the source information and/or the normalized information 520. In one example embodiment, the relay code may contain a generated code and may contain one or more account numbers. The account numbers may be used to, for example, track the source from which the normalized information 520 came from. The generated code may be used to track the information at the source. For example, the account number may identify that the relay code is associated with a DMV database, while the code may identify the source information within the DMV database. The account numbers may also be used to identify a business, such as the business 185, and/or a customer, such as the customer 175.

In one example embodiment, the relay code 530 may also include a biller relay account number that may be used to track the relay codes that have been generated for a business, such as the business 185 illustrated in FIG. 1. By tracking the biller relay account number, the business may be able to supplement information the business may have regarding its customers using the information linked by the relay codes. For example, the business may be a utility company that may have physical addresses, but not electronic contact information for its customers. At the utility company's request, the physical addresses for the customers may be used to search for electronic contact information for the customers of the utility company. When the electronic contact information for the utility company's customers are identified, a relay code may be generated that includes a biller relay account that identifies the utility company. Using the biller relay account number, the utility company may retrieve the relay codes that have been generated for its customers and/or reference the electronic contact information linked by the relay codes.

Referring back to FIG. 2, at 220, codes may be analyzed from respective sources for similarities of codes that correspond to the same party above a similarity threshold. This may be done, for example, to anonymously link information regarding a customer, such as the customer 175, in one or more sources without having to move any of the information from its original location. For example, a first code and a second code may be identified as corresponding to a customer above a similarity threshold. The first code may reference a cell phone number that belongs to the customer in a cell phone provider's database. The second code may reference a bank account number that belongs to the customer in a financial institutions database. In identifying the codes as being similar, the bank account and the cell phone number may also be associated with the customer. FIG. 6 provides more details regarding the code analysis as 220.

FIG. 6 illustrates an example embodiment for analyzing codes from respective sources for similarities between codes that are determined to correspond to the same party above a similarity threshold. At 610, a first relay code and a second relay code are retrieved from one or more data sources. For example, a first relay code may be retrieved from a data partner and the second relay code may be retrieved from a communication partner. In one example embodiment, the first and second relay codes are retrieved by submitting a request to a relay code generator module 135. Upon receiving the request, a previously generated code may be retrieved, a new code may be generated, or a combination of the two functions may be performed. In another example embodiment, the relay codes may be retrieved from an address profile that may be stored on a computing device that may belong to a business, a customer, or a third party that may not be either the business or the customer. For example, the third party may be a relay network provider that may help a business transmit an electronic communication to a customer of the business even though the business may not know the electronic contact information for its customer.

At 615, a similarity threshold may be retrieved. The similarity threshold may be a statistical variable that may define how similar the first and second code must be. For example, the similarity threshold may be a requirement that codes are 95% similar. In one example embodiment, the similarity threshold may be generated by any statistical analysis algorithm known in the art. For example, the statistical threshold may be generated by a cluster analysis, principal component analysis, sparse principal component analysis, factor analysis, multivariate Gaussian distribution, or the like. In another example embodiment, a similarity threshold may be retrieved that had been previously generated.

At 620, a determination may be made as to whether the first and second relay codes correspond to a same party above the similarity threshold. In one example embodiment, an algorithm may be used to determine a comparison value that indicates how similar the first and second relay codes are similar. The algorithm may be a cluster analysis, principal component analysis, sparse principal component analysis, factor analysis, multivariate Gaussian distribution, or the like. When the comparison value has been determined, the comparison value is then analyzed against the similarity threshold. When the comparison value surpasses the similarity threshold, it may then be determined that the first and second relay codes correspond to a same party.

Referring back to FIG. 2, at 225, an address profile for the same party having codes that are matched may be associated. This may be done to link information in a plurality of sources that may correspond to a party. In one example embodiment, an address profile may be created and associated with codes that correspond above the similarity threshold for the same party. For example, an address profile may be associated with a first code that may link to electronic contact information in a first source, and may be associated with a second code that may link to financial information in a second source. In another example embodiment, when codes correspond above the similarity threshold for the same party, the codes may be associated with a previously created address profile for the same party. For example, the previously created address profile may be retrieved and the codes and/or information contained within the created address profile may be updated in accordance with matched codes.

Figure 7:
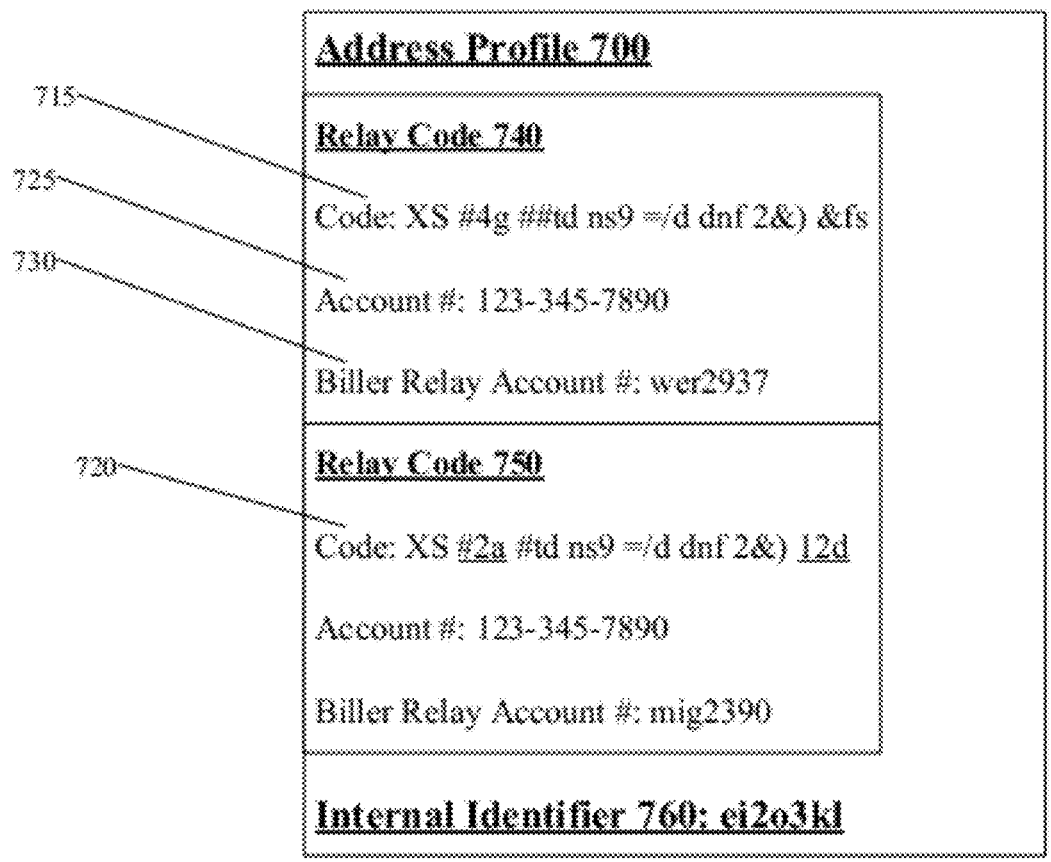
FIG. 7 illustrates an example embodiment for associating an address profile for a same party having codes that are matched.

After an address profile has been created or updated, an internal identifier may be assigned to the profile to, for example, identify the address profile and/or the matched codes associated with the address profile. FIG. 7 illustrates an example embodiment for associating an address profile for the same party having codes that are matched. As illustrated, an internal identifier, such as the internal identifier 760, may be assigned to the first and second relay codes that correspond above the similarity threshold. This may be done to link the first and second relay codes, such as the relay code 740 and the relay code 750. The internal identifier may be any identifier that may be used to identify a record. For example, the internal identifier 760 may be an account number, a code, a digital signature, a digital certificate, a check sum, a key generated by a hash table, or the like. Additionally, the internal identifier 760 may be used to link the first and second relay codes to other codes that may correspond to the same party without using the identity of the same party. In one example embodiment, the internal identifier 760 may use the codes to build a profile, such as the address profile 700, of the same party while keeping the identity of the same party anonymous. For example, the relay code 740 and the relay code 750 may be identified as corresponding to a customer above a similarity threshold as code 715 and code 720 are similar. The relay code 740 may reference a cell phone number that belongs to the customer in a cell phone provider's database. The cell phone provider may be identified by the biller relay account number 730, while the cell phone provider's database may be identified by the account number 725. The account number 725 may also correspond to the customer's cell phone account number with the cell phone provider. The relay code 750, on the other hand, may reference a bank account number that belongs to the customer in a financial institutions database. The internal identifier 760 may be assigned to the relay code 740 and the relay code 750, such that the internal identifier 760 may be used to reference the cell phone via the relay code 740 and reference the bank account via the relay code 750 without revealing the identity of the customer.

Figure 8:
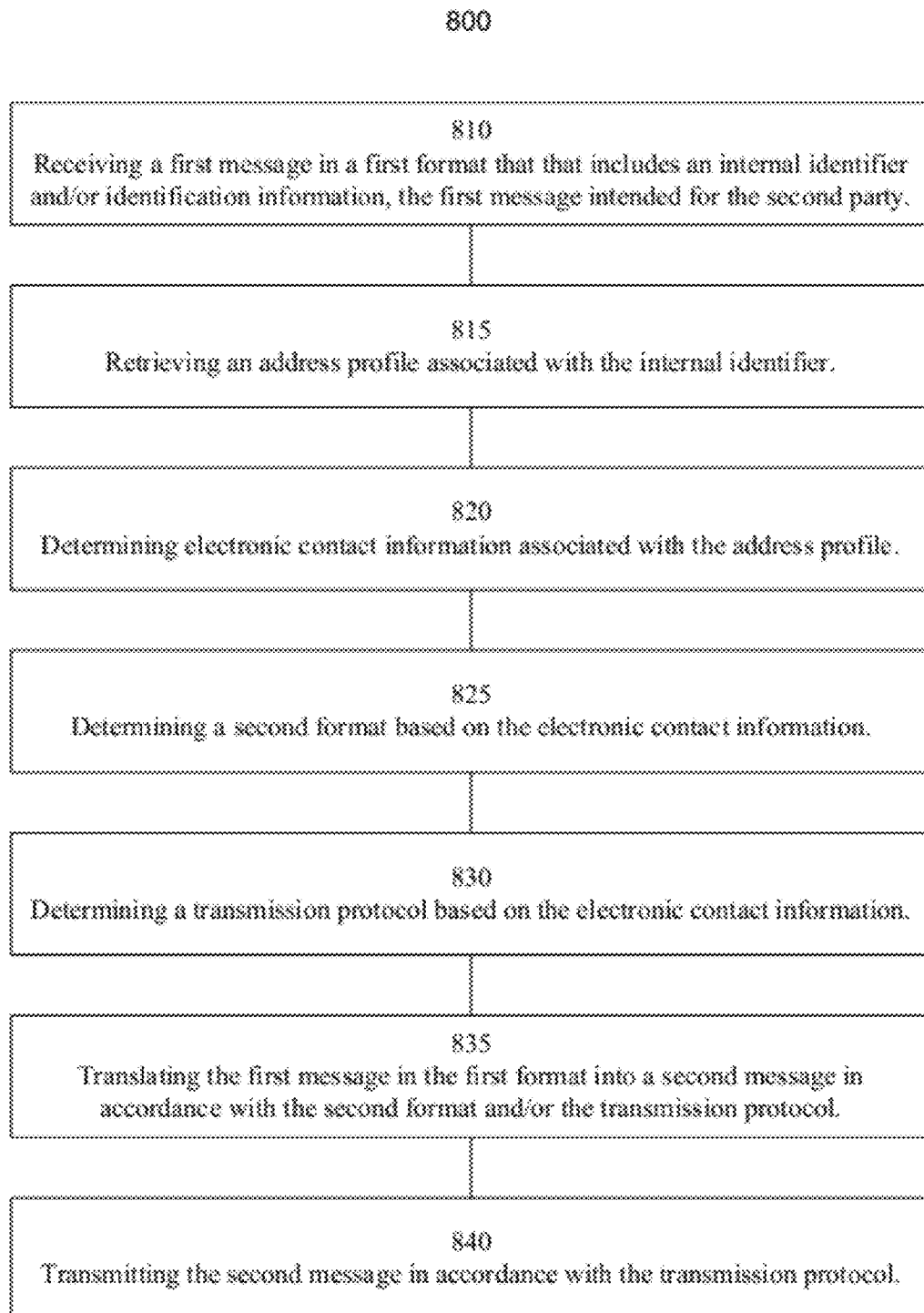
FIG. 8 illustrates an example embodiment for sending a communication from a first party to a second party using electronic contact information in a created profile.

FIG. 8 illustrates an example embodiment for sending a communication from a first party to a second party using electronic contact information in a created profile. The first party may be a business, such as the business 185 with respect to FIG. 1. The second party may be a customer, such as the customer 175 with respect to FIG. 1. According to the example embodiment, the customer 175 may hold an account with the business 185. The account may be a bank account, a cell phone account, a utility account, a department of motor vehicle (DMV) account, or the like.

At 810, a first message may be received in a first format that may include an internal identifier and/or identification information. The first message may be a letter, a bill, a notification, or the like. The internal identifier may be the internal identifier 760 described with respect to FIG. 7. In one embodiment, the internal identifier 760 may be provided by the first party. For example, the first party may use identification information associated with the second party to generate an internal identifier. The internal identifier may then be provided in a first message. This may be done to, for example, ensure that identification information associate with the second party does not leave the control of a first party and or is not revealed to a third party.

The identification information may be any information that may be used to identify the second party such as an account number, name, physical address, or the like. The identification information may be any information used to uniquely identify the customer 175 such as a physical address, an account number, name, a phone, Social Security number, a driver license, a credit card, or the like.

In one example embodiment, the identification information may be provided by the first party. For example, the first party may include identification information associated with the second party within a message in order to identify an address profile that may contain electronic contact information for the second party. Upon receiving the identification information, the identification information may be used to determine an internal identifier that may be associated with a created address profile. For example, the name of a customer may be provided in a message from the first party and may be used to generate an internal identifier to search for an address profile.

In one example embodiment, the first party may provide identification information for the second party that may allow a third party, such as a relay network provider, to identify the second party. For example, a business may provide the name of a customer to a relay network provider that maintains created address profiles. Using the provided name, the relay network provider may identify the customer and may then search for a created address profile that may be associated with the named customer. After identifying the named customer, the relay network provider may search additional sources for information, such as publically available information, that may relate to the named customer.

In another example embodiment, the first party may provide identification information for the second party that prevents a third party, such as a relay network provider, from identifying the second party. For example, a business may provide an account number to a relay network provider that maintains created address profiles. Without identifying the customer, the relay network provider may use the account number to determine an internal identifier that may be associated with a created address profile. The relay network provider may then use the internal identifier to search for a created address profile associated with the customer.

In an example embodiment, the identity of the first party and the second party may be kept anonymous such that the identity of the first party and the second party is not known or possible to discover. For example, a message from a first party to a second party may be received by a third party that maintains the created address profiles in the computing environment 125 of FIG. 1. In one example embodiment, the message may include identification information for the second party using the identification information for the second party; the third party may generate a code for the second party without identifying the second party. The third party may then search for a created address profile that may include a code similar to the generated code for the second party. When a created address profile is found, electronic information that may be included in the created address profile may then be used to send the message from the first party to the second party. In another example embodiment, the message received from the first party may include an internal identifier and/or a code. Using the internal identifier and/or code, the third party may search for a created address profile. When a created address profile is found that matches the internal identifier and/or code, the third party may then reference the electronic contact information in the found address profile in order to send the message from the first party to the second party.

After the first message has been received, the first format may be identified. The first format may be the format of the message provided by the first party. In one example embodiment, the first format may be identified by analyzing the message received. In another example embodiment, the first format may be determined before, or as the electronic contact information is received. For example, the first message may contain an identifier that identifies the first format.

At 815, an address profile associated with the internal identifier and/or identification information may be retrieved. As described above, the internal identifier may be associated with an address profile. Using the internal identifier and/or identification information from the first message, a search may be performed to discover address profiles that may contain electronic contact information for the second party. For example, an address profile that contains electronic contact information for the customer 175 may include an internal identifier that matches the internal identifier provided in the first message. When an internal identifier that belongs to an address file for profile matches the internal identifier provided in the first message, the address profile may then be retrieved.

At 820, electronic contact information associated with the address profile may be determined. As described above, an address profile may include codes. The codes may be associated with information, such as electronic contact information, that may be located in a plurality of sources. For example, the codes may be used to reference the information and may permit the information to be used without moving the information from its original source. In one example embodiment, the codes associated with the address profile are searched for any electronic contact information associated with the second party. When electronic contact information is discovered, the electronic contact information may then be determined. In determining the electronic contact information, the code associated with the electronic contact information may be identified and/or the electronic contact information may be retrieved. In another example embodiment, the first message may be analyzed to determine the electronic contact information that would be necessary to transmit the message to the second party. The codes associated with the address profile may then be searched for the necessary electronic contact information. When the necessary electronic contact information is discovered, the electronic contact information may then be retrieved.

At 825, a second format based on electronic contact information may be determined. The second format may be the format that is necessary to send an electronic communication to the second party. For example, the electronic contact information may indicate that the customer has a cell phone capable of receiving text messages. In one example embodiment, upon determining the second format, the first message may be translated from the first format into a second format. For example, the first message may be in an XML format and may be translated into HTML that is then e-mailed to the second party.

At 830, the transmission protocol based on electronic contact information may be determined. In one example embodiment, the electronic contact information may indicate that a transmission protocol that may be required to transmit a message to the second party. For example, the electronic contact information may contain a cell phone number that may be used to send a SMS to the second party using the SS7 protocol. When the electronic contact information requires a transmission protocol, one or more transmission protocols based on the electronic contact information may be retrieved and/or selected. The transmission protocol may be any protocol used to transmit an electronic communication such as the transmission control protocol (TCP), the user datagram protocol (UDP), the SS7, or the like.

At 835, the first message in the first format may be translated into a second message in accordance with the second format and/or the transmission protocol. In one example embodiment, the first message may be translated from the first format into a second format. For example, the first message may be in an XML format and may be translated into an SMS message. Once the first message is in a second format, the first message in the second format may be further adjusted to accommodate the transmission protocol. For example, certain characters used in the first message may not be used in accordance with the transmission protocol. To accommodate the transmission protocol the first message may be translated into a second message.

At, 840 the second message may be transmitted in accordance with the transmission protocol. For example, the second message may be an SMS message is transmitted via the SS7 protocol to the second party.

Those skilled in the art also will readily appreciate that many additional modifications are possible in the exemplary embodiment without materially departing from the novel teachings and advantages of the invention. For example, the system described herein may be used to supplement the contact information for customers of a business where the customers are, of course, known to the business. This may be done to, for example, allow a utility company to enroll its customers into an electronic billing system without requiring the utility company customers to provide electronic contact information. In one example embodiment, the utility company may have a database that includes physical addresses, account numbers, and names for its customers; however, the utility company does not have any electronic contact information for its customers. On the other hand, a cell phone company may have a server that includes the electronic contact information for the customers of the utility company. Due to privacy concerns, the electronic contact information must be kept anonymous and may not be removed from the server that belongs to the cell phone company. To alleviate the privacy concerns, the exemplary embodiment may analyze the contact information on the server belonging to the cell phone company and generate codes that may link to the electronic information. The codes may then be associated with created address profiles such that the electronic information may remain anonymous and at the server belonging to the cell phone company. The created address profiles may then be used by the utility company to send its customers a text message asking them if they would like to receive electronic bills on their cell phone. For example, the exemplary embodiment may match the created address profiles by analyzing the database of the utility company. In analyzing the database of the utility company, the exemplary embodiment may use the physical addresses, the account numbers, and the names to generate codes. These codes may then be used to search for the created address profiles associated with the cell phone company. When the created address profiles have been found, the codes within the created address profiles may be used to reference the electronic contact information within the cell phone company server. Using the references to the electronic contact information the exemplary embodiment may send text messages to the utility company customers asking the customers if they would like to receive electronic bills on their cell phone. Additionally, the utility company may transmit electronic bills to the customers' cell phones.

Accordingly, any such modifications are intended to be included within the scope of this invention as defined by the following exemplary claims.

What is claimed:

1. A method of enabling electronic communication from a first party to a second party with whom the first party has or has ever had a relationship or account, whereby such communications occur without the first party necessarily having or obtaining knowledge of the second party's electronic contact information, comprising:
    creating address profiles for a plurality of parties that may include said second party by:
        collecting information from a plurality of sources, said information including electronic contact information for parties that may include the second party,
        assigning codes to the information from each source for each party as collected in said collecting step,
        analyzing codes from respective sources for similarities of codes that correspond to a same party above a similarity threshold,
        associating an address profile for the said same party having codes that are matched, and
    the first party providing identification information for the second party; and
    if the identification information for the second party matches a created address profile for the second party, sending the electronic communication from the first party to the second party using electronic contact information in the created address profile.

2. The method of claim 1, wherein the first party provides account information that identifies a second party to a third party as the identification information for matching with the created address profile.

3. The method of claim 1, wherein the first party provides account information that prevents a third party from identifying the second party as the identification information for matching with the created address profile.

4. The method of claim 1, wherein a third party maintains the created address profiles and identifies said second party to said first party by an internal identifier whereby said third party may not know the identify of the second party or the content of the electronic contact information.

5. The method of claim 1, wherein a third party maintains the created address profiles and identifies said second party to said first party by an internal identifier whereby said first party may not obtain the electronic contact information of said second party from said internal identifier.

6. The method of claim 1, wherein said assigning codes to the electronic contact information from each source for each party as collected in said collecting step comprises:
   normalizing the electronic contact information into a form suitable for code generation; and
   generating a code based on the normalized information.

7. The method of claim 6, wherein generating a code based on the normalized information comprises using a fingerprinting algorithm.

8. The method of claim 1, wherein analyzing codes from respective sources for similarities for codes that correspond to a same party above a similarity threshold comprises performing a statistical analysis of the codes.

9. The method of claim 1, wherein associating an address profile for the same said party having codes that are matched comprises updating a created address profile with the electronic contact information from each source for each party assigned to said matched codes.

10. The method of claim 1 wherein sending the electronic communication from the first party to the second party using electronic contact information in the created address profile comprises translating the electronic communication in a first format into a deliverable electronic communication in a second format.

11. The method of claim 1 wherein sending the electronic communication from the first party to the second party using electronic contact information in the created address profile comprises:
   determining one or more transmission protocols based on the electronic contact information; and
   translating the electronic communication in a first format into a deliverable electronic communication in a second format in accordance with the one or more transmission protocols.

12. A system for enabling electronic communication from a first party to a second party with whom the first party has or has ever had a relationship or account, whereby such electronic communications occur without the first party necessarily having or obtaining knowledge of the second party's electronic contact information, the system comprising:
   a processor, the processor for executing computer executable instructions, the computer executable instructions comprising instructions for:
      creating address profiles for a plurality of parties that may include said second party by:
         collecting information from a plurality of sources, said information including electronic contact information for parties that may include the second party;
         assigning codes to the information from each source for each party as collected in said collecting step;
         analyzing codes from respective sources for similarities of codes that correspond to a same party above a similarity threshold;
         associating an address profile for the same said party having codes that are matched;
      receiving identification information for the second party from the first party;
      determining if the identification information for the second party matches a created address profile for the second party; and
      if there is a match in said determining step, sending the electronic communication from the first party to the second party using electronic contact information in the created address profile.

13. The system of claim 12, wherein the processor receives account information for the second party that identifies the second party to the processor from the first party for matching with the created address profile.

14. The system of claim 12, wherein the processor receives account information for the second party that prevents the processor from identifying the second party as the identification information for matching with the created address profile.

15. The system of claim 12, wherein the processor maintains the address profiles in a database and identifies said second party to said first party by an internal identifier whereby said third party may not know the identity of the second party or the content of the electronic contact information.

16. The system of claim 12, wherein the processor maintains the address profiles in a database and identifies said second party to said first party by an internal identifier whereby said first party may not obtain the electronic contact information of said second party from said internal identifier.

17. The system of claim 12, wherein the processor assigns codes to the electronic contact information from each source for each party by normalizing the electronic contact information into a form suitable for code generation and generating a code based on the normalized electronic contact information.

18. The system of claim 16, wherein the processor implements a fingerprinting algorithm to generate a code based on the normalized information.

19. The system of claim 12, wherein the processor analyzes codes from respective resources for similarities to codes that correspond to a same party above a similarity threshold by performing a statistical analysis of the codes.

20. The system of claim 12, wherein the processor associates an address profile for the same said party having codes that are matched by updating a created address profile with the electronic contact information from each source for each party assigned to said matched codes.

21. The system of claim 12 wherein the processor sends the electronic communication from the first party to the second party using electronic contact information in the created address by translating the electronic communication in a first format into a deliverable electronic communication in a second format.

22. The system of claim 12 wherein the processor sends the electronic communication from the first party to the second party using electronic contact information in the created address profile by:
   determining one or more transmission protocols based on the electronic contact information; and translating the electronic communication in a first format into a deliverable electronic communication in a second format in accordance with the one or more transmission protocols.

* * * * *